United States Patent [19]
Goodridge et al.

[11] Patent Number: 5,848,393
[45] Date of Patent: Dec. 8, 1998

[54] "WHAT IF . . ." FUNCTION FOR SIMULATING OPERATIONS WITHIN A TASK WORKFLOW MANAGEMENT SYSTEM

[75] Inventors: Gilbert W. Goodridge, Lexington, S.C.; Michael J. Komichak, Alexandria, Va.

[73] Assignee: NCR Corporation, Dayton, Ohio

[21] Appl. No.: 573,310

[22] Filed: Dec. 15, 1995

[51] Int. Cl.⁶ .................................................. G06F 17/60
[52] U.S. Cl. ............................ 705/8; 395/670; 364/578
[58] Field of Search ...................... 705/7, 8, 9; 395/670, 395/672, 673, 674, 676, 200.33, 200.37; 364/578

[56] References Cited

U.S. PATENT DOCUMENTS

| | | | |
|---|---|---|---|
| 4,658,351 | 4/1987 | Teng | 395/673 |
| 5,016,170 | 5/1991 | Pollalis et al. | 705/7 |
| 5,163,016 | 11/1992 | Har'El et al. | 364/578 |
| 5,301,320 | 4/1994 | McAtee et al. | 705/9 |
| 5,319,543 | 6/1994 | Wilhelm | 705/3 |
| 5,481,668 | 1/1996 | Marcus | 345/349 |
| 5,530,861 | 6/1996 | Diamant et al. | 705/8 |
| 5,627,764 | 5/1997 | Schutzman et al. | 395/200.37 |
| 5,630,069 | 5/1997 | Flores et al. | 705/7 |
| 5,706,452 | 1/1998 | Ivanov | 705/8 |

*Primary Examiner*—Eric W. Stamber
*Attorney, Agent, or Firm*—Gates & Cooper

[57] ABSTRACT

A computer-implemented task workflow management system having built-in functions for simulating operations and performing rule syntax checks. A rule editor is provided for editing a plurality of rules describing a predetermined task execution sequence. The rule editor includes means for simulating a rule execution without having to create work items to send through a map. The syntax of a rule may be checked and a list of the instance variables in the rule being tested may be provided. A message box may be provided to display a result of the simulation and the successfully firing clause may be highlighted.

30 Claims, 4 Drawing Sheets

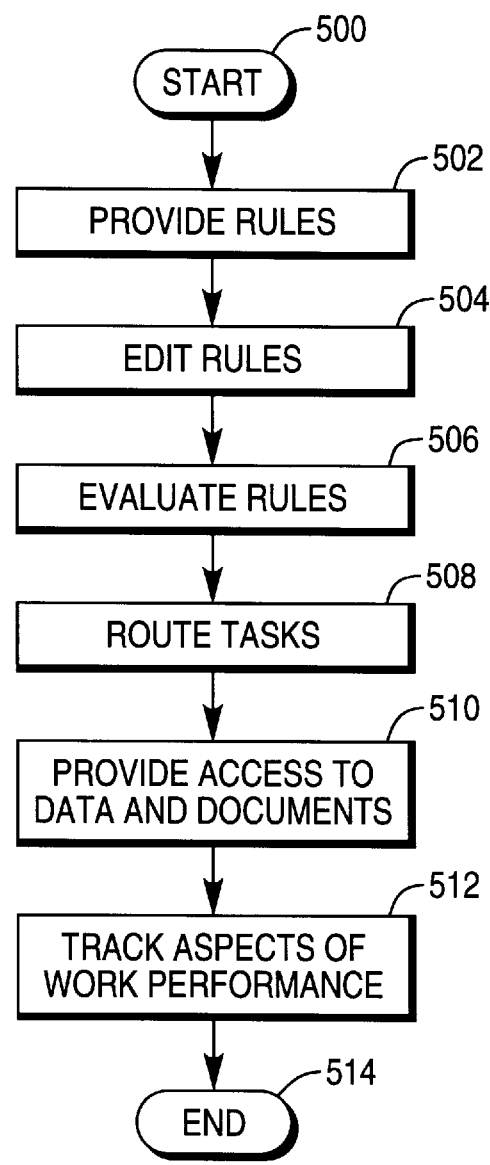

"WHAT IF . . . " FUNCTION FOR SIMULATING OPERATIONS WITHIN A TASK WORKFLOW MANAGEMENT SYSTEM

CROSS-REFERENCE TO RELATED APPLICATIONS

This application is related to application Ser. No. 08/572,928 entitled "Task Workflow Management System and Method Including An External Program Execution Feature," filed on same date herewith, by G. Goodridge et al., now U.S. Pat. No. 5,799,297, and assigned to the assignee of this application, which application is incorporated by reference herein.

BACKGROUND OF THE INVENTION

1. Field of the Invention

The present invention relates in general to task workflow management systems, and more particularly, to task workflow management systems having built-in functions for simulating operations and performing rule syntax checks.

2. Description of Related Art

In the past, computerized integrated office systems (IOS) products were introduced by many companies to boost productivity among white-collar workers. Companies implementing such systems typically realize two benefits: individual productivity increases, and communication between individuals and work groups is faster and more efficient.

Spreadsheets, word processors, and personal calendar applications are among the tools that increase individual productivity. Group services, such as electronic mail and electronic scheduling have accelerated and streamlined office communications. These activities have taken place in a common, multi-user environment. Since integrated office systems are usually host-based, these business systems typically run on minicomputers or mainframes.

During the 1980s, the growth of integrated office systems was challenged by advances in the personal computer (PC) industry. Personal productivity software tools developed for the PC were superior to those included with integrated office systems. These tools were easy to use, affordable, and diverse. PC software vendors were able to develop, introduce, and improve their products faster than their IOS competitors. Soon, PC-based software was the product of choice for businesses shopping for spreadsheet, word processing, or other personal productivity software packages. Inherent benefits associated with the PC platform (user friendliness, rapid screen refreshing, local disk storage, and others) cemented the PC's position in the workplace.

Despite their growing popularity, PCs still lagged behind integrated office systems in two important areas: communication and access to information. In the early years of PC development, individuals working on PCs could not share files, coordinate schedules, or communicate electronically, as people working in an IOS environment could. Local area network (LAN) products, which could connect between PCs for file exchange, electronic mail, and scheduling, emerged to address this deficiency. Small, independent workgroups began to form, often outside of the corporate Management Information Systems (MIS) department. Members of these workgroups either did the same type of work and needed to share or exchange information, or had complex communication requirements.

By using LANs to connect personal computers within workgroups, members of accounting departments, administrative groups, and small businesses could share files and communicate electronically. By the mid-1980s, it was common to find small decentralized workgroups creating, distributing, and storing information electronically using PCs connected by LANs.

Despite its convenience, the PC/LAN approach did little to automate the steps involved in executing and monitoring the work that takes place within or between workgroups. It will be appreciated by those skilled in the art that groupware-software for automating the process of people working together is one of the next important developments in the evolution of workplace automation.

Groupware products are defined within two categories: information-based groupware and transaction-based groupware. Information-based groupware is passive. It does not begin working until a user directs it to do so. Many widely used products belong to this category (e.g., basic electronic mail (E-mail)).

In contrast, transaction-based groupware is active. Workflow software systems are one such type of transaction-based groupware. Workflow systems handle system processing automatically by routing items and managing workflow based on rules set up by users. This type of groupware is particularly effective when used in a data processing system where electronic documents, rather than paper documents, can be passed from one processing step to the next.

Workflow systems often include a core set of features. A need exists for these workflow systems to add additional functionality beyond this core set. Prior systems have provided functionality for adding and deleting rules and variables, but have not enabled an administrator to test specified logic errors by simulating the running of a rule without having to create work items.

It can be seen then that there is a need for a workflow system which allows the testing of rule syntax and the analyzing of rule performance with different data values to observe the routing performed by the rule.

SUMMARY OF THE INVENTION

To overcome the limitations in the prior art described above, and to overcome other limitations that will become apparent upon reading and understanding the present specification, the present invention discloses a task workflow management system and method including a simulation and syntax analysis feature.

The present invention solves the above-described problems by providing a task workflow management system with built-in functions for simulating operations and performing rule syntax checks.

A system in accordance with the principles of the present invention includes a rule editor means for editing a plurality of rules describing a predetermined task execution sequence. The rule editor means includes simulation means for initiating a simulated running of a rule without having to create work items to send through a map.

One object of the present invention is that the syntax of a rule may be checked. Another object of the present invention is that a list of the instance variables in the rule being tested may be provided. Another object of the present invention is that a message box displays a result of the simulation and the successfully firing clause may be highlighted. Another object of the present invention is that a syntax check can select the portion of the clause that is in error.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 5 is a flowchart of a method of operation of the WFM system shown in FIG. 1 in accordance with the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Several workflow management (WFM) systems exist. Many WFM systems are based on a client/server architecture designed for maximum portability across operating systems and data base management system (DBMS) platforms. WFM systems typically manage the routing, queuing, and tracking of work or tasks. In addition, WFM systems may define computer-based work steps or tasks, workflow data management, and the user interface, but these parts of the WFM system may be left to system integrators to develop.

Figure 1:
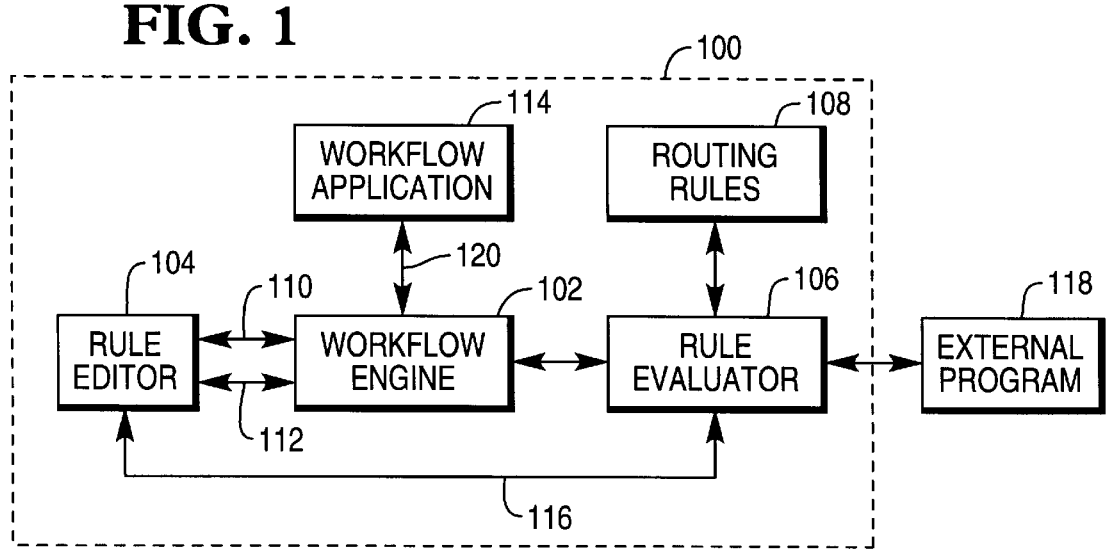
FIG. 1 is a block diagram of the preferred embodiment workflow management (WFM) system in accordance with the present invention.

Referring now to FIG. 1, a block diagram of the preferred embodiment WFM system 100 in accordance with the present invention (also known as ProcessIT™ from AT&T Global Information Solutions) is shown.

The WFM system 100 is a client/server groupware product for developing, executing, and managing automated process paths within an enterprise. To understand how the WFM system 100 automates workplace procedures, imagine that your company has hired a firm, Mercury Inc., to manage your work routing procedures. Mercury supplies couriers who have memorized all office procedures, both formal and informal. The procedures are presented in a process map format, which is a graphical representation of the workflow as defined by the business process owner. Mercury can provide an unlimited number of couriers to follow these process maps.

The Mercury courier follows the process map from one step to the next, carrying work items or data references. In a mortgage loan processing cycle, couriers direct the routing of loan applications, credit reports, and income summaries for an applicant to the loan officer, to credit approval agents, and to others through the approval cycle. For insurance claim processing, couriers follow the process maps through the data entry step, to the verification or suspense step, then to the benefits and payment steps, and finally to the archival step.

Changing procedures is simple, because all Mercury couriers take instructions easily and change procedures as directed. If two people need to review the same document, Mercury couriers make copies for each person simultaneously. Slowdowns are rare, because Mercury monitors work levels and distributes work among qualified individuals. Mercury couriers concentrate on routing work, allowing your employees to focus on processing the work, not routing it.

The WFM system 100 is an electronic Mercury. It is an application coordinator, governing the flow of work between applications and electronic data files so that they work together logically and harmoniously. The WFM system's 100 main function is to guarantee that data follows the logical processing steps defined by the organization.

The WFM system 100 connects information processing centers within an enterprise by electronically routing work along the process paths defined by the business process owner. Images, data, objects, messages, and combinations of these are all regarded by the WFM system 100 as work to be routed along prescribed processing paths.

The WFM system 100 preferably is a rule-based routing product. It offers users the ability to capture and execute organization-specific policy rules in order to determine the path of a work item ("courier") in a process map. The WFM system 100 generates routes for a work item by accessing application data associated with the work item and interpreting the user-supplied policy rules in this context.

A WFM system 100 work item travels between the nodes ("activities") of a directed graph ("map") via edges labeled with "return states". The rule-based routing WFM system 100, via a graphical user interface (GUI), allows a system administrator to specify a way to compute a return state at run-time using a language of conditional expressions composed of variables, constants, and operators. Such rule-based systems are very flexible, because values of the variables in the rules can be readily changed.

Figure 2:
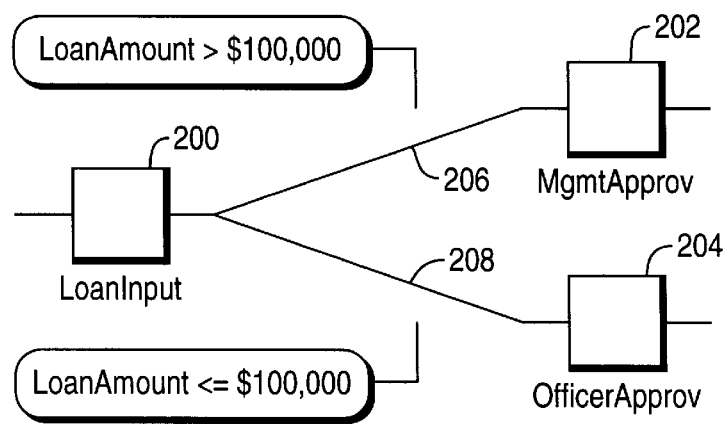
FIG. 2 is a block diagram of an example rule which could be implemented in the WFM system shown in FIG. 1.

In FIG. 2, a system administrator has specified that loans 200 in excess of $100,000 should be routed to MgmtApprov 202; otherwise, they should be routed to OfficerApprov 204. The system administrator can modify the $100,000 threshold "on-the-fly"without changing any of the application software.

The return state (i.e., the edges or arcs 206 and 208 in this example) may be computed automatically by user-written software (with or without any user input). This enforces organizational policy to determine the routing of work items. However, users must engineer and maintain this solution themselves. Users may be unable to completely separate the routing functionality from their application software since they cannot incorporate the routing logic into the WFM system 100 to yield a general solution.

The difficulty of using automatic routing support can be alleviated by the implementation of rule-based routing that provides several advantages. These advantages include:

Abstraction—separating the application from the process. The routing software removes the routing mechanism from the user's software. This allows users to change routing instructions without necessarily requiring changes to a user's application (and vice versa).

Accessibility—sophisticated routing capabilities can be accessed directly by users which means that users are freed from having to engineer and maintain their own inferencing software. Users can focus their attention on the business meaning of the process rather than on the implementation mechanics of the process. This encourages more effective use of WFM system 100 in business processes.

Context Sensitivity—the routing software includes an interface for communicating instance-specific information to the rule evaluator 106.

This information enables the rule evaluator 106 to more intelligently make decisions about the disposition of work in a user's business process.

The automatic routing support preferably is enabled by the use of four software modules: a rule editor 104, a rule application programming interface (API) 110, a variable API 112, and a rule evaluator 106. The rule editor 104 has a GUI through which a customer defines routing rules 108. The rule editor 104 communicates with the workflow engine 102 via the rule API 110 and the variable API 112. The rule evaluator 106 interprets the user-defined rules 108 and routes work items (i.e., tasks), accordingly. The rule evaluator 106 contains an interpreter which understands rules written in a preferred embodiment rule language.

In addition to these software modules, the automatic routing support interacts with a process activity manager (PAM) and the PAM's underlying database residing in the workflow engine 102 as well as with the user's application 114.

A system administrator uses the rule editor 104 from a client to create new routing rules 108 or to inspect/modify/delete existing routing rules 108. The administrator can test routing rules before they take effect in a business application 114 by providing values for rule variables and then directly submitting the rule to the server rule evaluator 106 from the rule editor 104. This direct submission may be accomplished through a direct connection 116 or a virtual connection which passes unchanged through the workflow engine 102. In either case, this allows the administrator to debug rule syntax and semantics without having to have any test work items run by the workflow engine 102 or the workflow application 114.

Routing rules 108 and variables preferably are stored in a database embedded in the WFM system 100. This database may also be used by other parts of the WFM system 100. Global variables (accessible system-wide to all applications) are normally given values by the administrator through a variable editor (not shown) which may have a GUI which is similar to and may run on the same client as the rule editor 104. Work item instance variables (reflecting data specific to an individual task work item) are set by the workflow application 114 using variable API 120 calls.

When a user returns a work item to a WFM activity, the rule evaluator 106 determines if a routing rule 108 has been defined for this activity. If a rule has been associated with the activity, the rule evaluator 106 interprets the rule (using an internal parser) in the context of any variables stored in the relational database and generates a return state for the work item. Otherwise, routing is accomplished using other existing workflow engine 102 functionality.

The rule language may be modeled after the "if" part of "if-then" statements. The following Table 1 lists the names of the operators and the symbols by which they are represented in this preferred embodiment rule language. It will be appreciated by those skilled in the art that other operators and/or symbols could be used without departing from the scope and spirit of the present invention.

TABLE 1

| Arithmetic | Exponentiation | ^ |
|---|---|---|
| | Negation | – |
| | Multiplication and Division | *,/ |
| | Integer Division | \ |
| | Modulo Arithmetic | Mod |
| | Addition and Subtraction | +,– |
| String Comparison | Concatenation | & |
| | Equality | = |
| | Inequality | <> |
| | Less than | < |
| | Greater than | > |
| | Less than or Equal to | <= |
| | Greater than or Equal to | >= |
| | Pattern Matching | Like |
| Logical/Bit-wise | Not | Not |
| | And | And |
| | Or | Or |
| | Exclusive Or | Xor |
| | Equivalence | Eqv |
| | Implies | Imp |

The Comparison operators return either True (–1) or False (0) as a result. True and False may be referred to by name or by their integer values of –1 and 0, respectively. With these values for True and False, logical operators and bit-wise operators are equivalent.

Most of the operators are commonly known and have their usual meaning. Xor represents "Exclusive Or". Eqv represents "Equivalence", which is the complement of Xor.

Imp represents "Implies". A Imp B is False if and only if A is True and B is False.

The "Like" comparison operator compares the string expression on the left side with a pattern on the right side. If the string matches the pattern, the result is True; otherwise, "Like" evaluates to False. All string comparisons are case sensitive, binary comparisons. The pattern can contain the wildcard characters *, ?, and #.? matches any single character in the string; * matches zero or more characters; # matches any single digit (0—9). The wildcard characters *, ?, and #, as well as the left bracket [, can be used to match themselves directly by enclosing them in brackets [ ].

An exemplary embodiment can be summarized in reference to FIG. 1 as a computer-implemented rule-based task workflow management system 100. A workflow engine 102 routes tasks in a predetermined task execution sequence to a plurality of workers according to a plurality of rules. The workflow engine 102 also provides access to data and documents required by each worker to complete a particular task. In addition, the workflow engine 102 tracks aspects of worker performance of the tasks in the predetermined task execution sequence.

The rule evaluator 106 is operatively coupled to the workflow engine 102 for evaluating the plurality of rules and providing instructions to the workflow engine 102 on routing the tasks in the predetermined task execution sequence. The rule editor 104 may be operatively coupled to the workflow engine 102 for editing the plurality of rules.

The Rule Editor allows a user to add new rules, edit existing rules, re-order clauses, check the syntax of rules and simulate the running of rules. An external program execution mechanism 118 is operatively coupled to the rule evaluator 106 for executing a program instruction external to the workflow management system 100 such that functionality of the workflow management system can be extended beyond a core workflow management feature set in the workflow engine 102. The program instruction may be associated with another computer-based system (e.g., a data base in which a query could be performed to: check a user's password, check on the status of equipment used to route tasks, or get other information needed by the WFM system 100).

Figure 3:
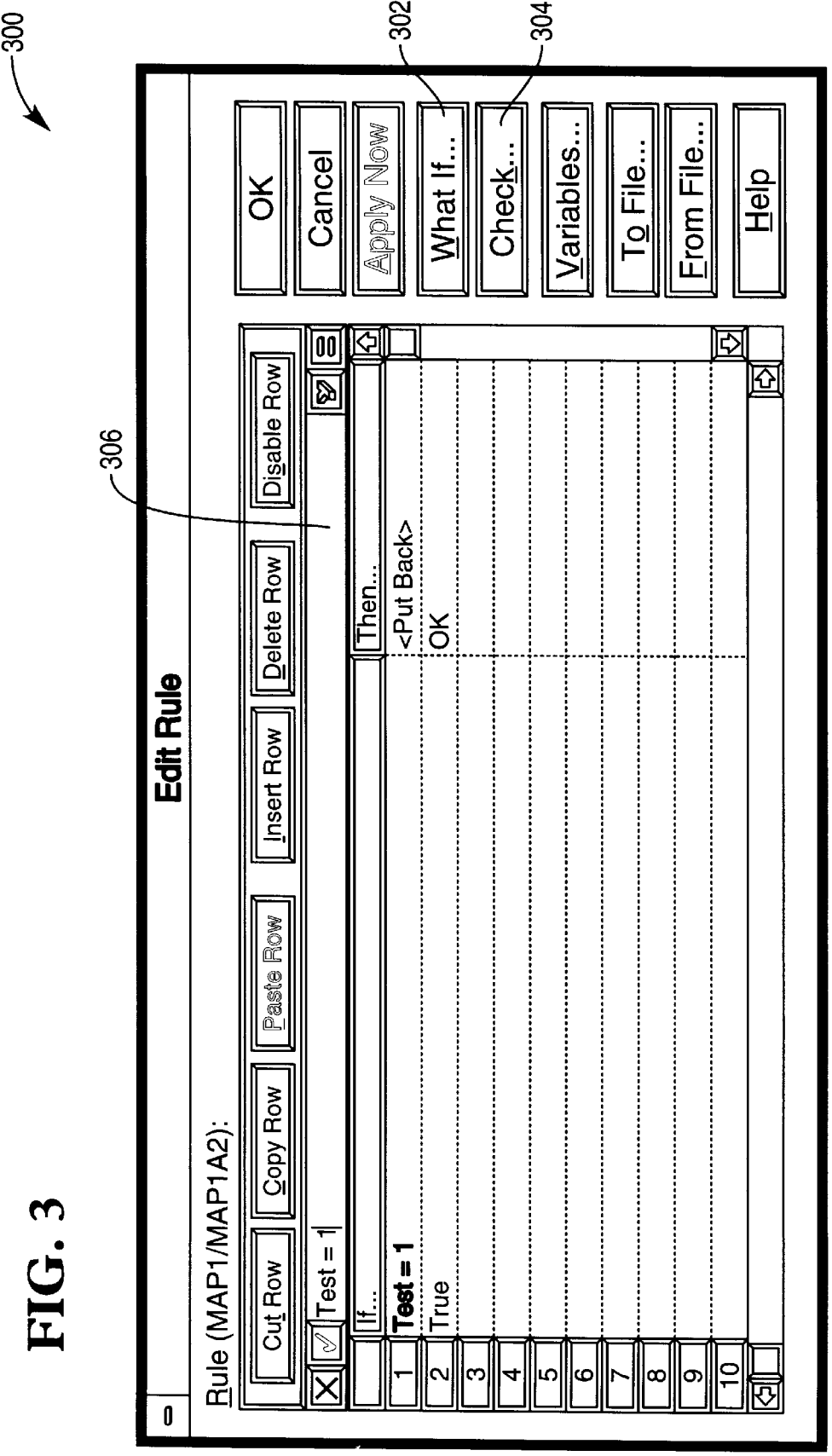
FIG. 3 is a diagram of an example dialog box for the edit rule functions implemented in the WFM system shown in FIG. 1.

The Rule Editor provides editing capability via Edit Rule functionality 300 as illustrated in FIG. 3. It is to be understood that the graphical representations are presented for illustration purposes and are not meant to limit the invention. Those skilled in the art will recognize that the functionality of the invention may be represented in other graphical formats. The Edit Rule functionality 300 allows administrators to use to add, change and view the rule. An Edit Rule Dialog provides the "What If" functionality 302 which allows the user to test a specified rule for logic errors or run test scenarios with different data values to see where the work is routed in specified cases. The "What If" functionality 302 may be embodied such that it is enabled only when none of the clauses have been modified. In this situation, if any of the clauses are modified the modifications must be applied before the "What If" functions 302 are used. A command, such as "Check" 304, may be issued to verify the syntax of all clauses in the rule, and a message box may be used to 15 display the results. Thus, if the check shows a syntax error and the user wants to fix the error, the "Check" clause may be selected and the erroneous portion of the clause highlighted in 306.

Figure 4:
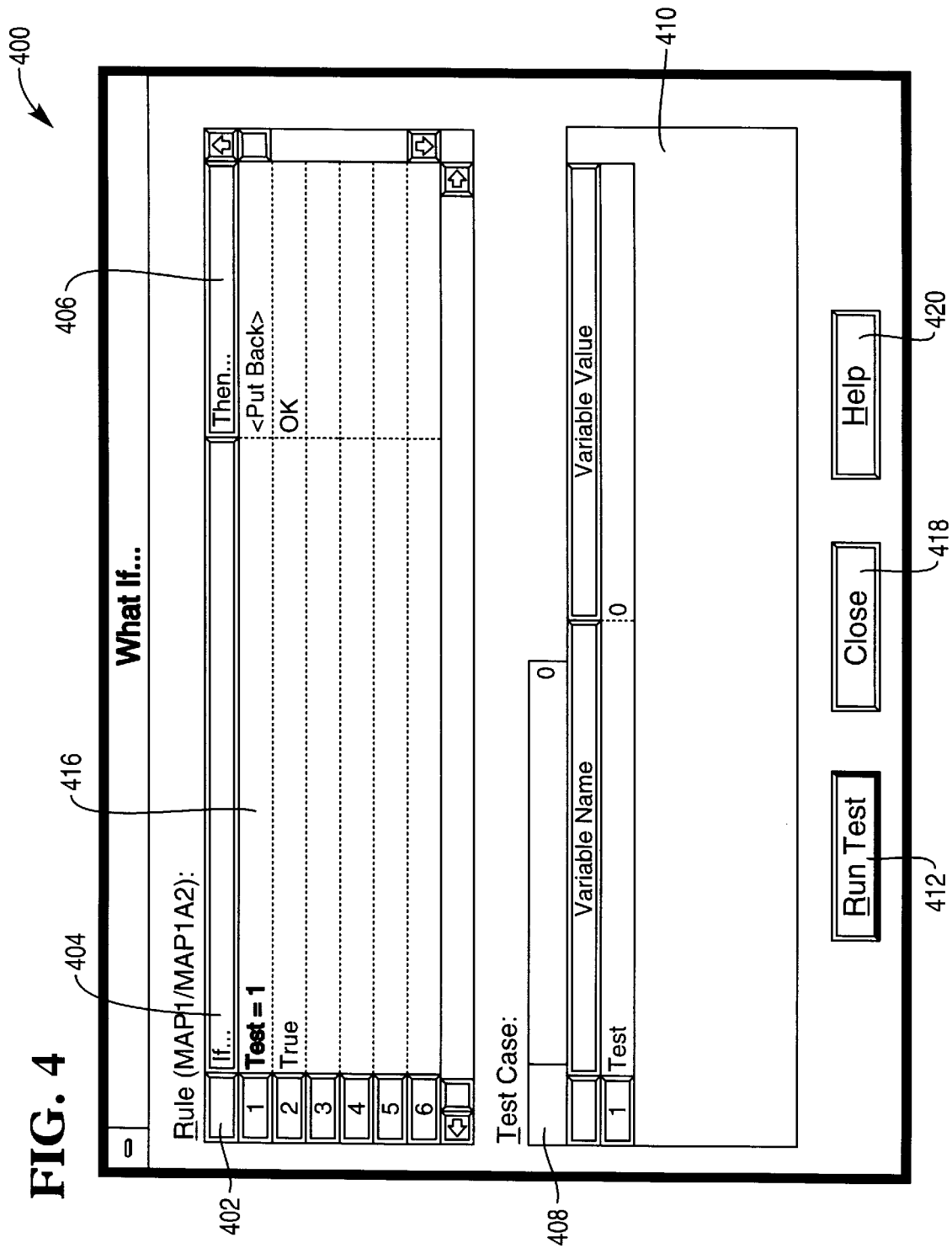
FIG. 4 is a diagram of an example dialog box for the "What If" functions implemented in the WFM system shown in FIG. 1.

FIG. 4 illustrates a "What If" dialog 400 according to the present invention. It is to be understood that the graphical representations are presented for illustration purposes and are not meant to limit the invention. Those skilled in the art will recognize that the functionality of the invention may be represented in other graphical formats. The "What If" functionality 400 allows a user to simulate the running of a rule without having to create work items to send through the map. This also assists in checking for logic errors. The "What If" dialog 400 may provide "If. . . Then . . . " functionality 402. For example, the condition may be indicated under the "If" heading 404, while the return state is indicated under the "Then" heading 406.

Unlike the Edit Rule functionality described with reference to FIG. 3, the editing of clauses is not provided for.

A "Test Case" grid 408 may be provided which lists all of the instance variables 410 in the rule that are being tested. This allows the setting of temporary instance variables for simulation in the grid. Further, "Run Test" functionality 412 may be provided to enable an administrator to start the simulation. When the rule evaluator completes the simulation, a message box may be displayed to indicate the result. In addition, the clause that fired successfully may be highlighted 416 in the Rule grid. The "What If" functions 400 may be closed 418 to return to the Edit Rule dialog and on-line help 420 may be integrated therein.

Now returning to FIG. 1, the Rule Evaluator 106 interprets a routing rule which has been associated with an activity by the System Administrator. The Rule Evaluator 106 understands rules written in the Rule Language and may be invoked by API calls such as CourierReturn and CourierAdd generated by the workflow application 114. The Rule Evaluator 106 provides a return state which routes the work item being returned or added to the system. Each of the API calls which invokes the Rule Evaluator 106 also requires a user-supplied return state parameter. If no clause in an activity's rule evaluates to TRUE, then the user-supplied return state is accepted for the work item. Otherwise, the return state specified by the rule is used for the work item and the user-supplied return state is ignored. Thus each activity's rule behaves as if it included a final, default clause which returns the user-supplied return state as its value.

The Rule Evaluator 106 determines the current activity from the work item being returned or added, and queries the embedded PAM database to retrieve any routing rule for this activity. If a rule does not exist, or if all of the clauses of the rule are suspended, then the API call proceeds as if the Rule Evaluator 106 were not present. If the rule system has been disabled and the activity has a rule, an error is returned. Otherwise, the Rule Evaluator 106 interprets the routing rule after substituting values for any global and work item instance variables in the rule. Values for these variables are available from the embedded PAM database, having been placed there by previous API calls.

The Rule Evaluator 106 may be invoked by a System Administrator via an API call to WFClauseCompute or WFRuleCompute generated by the "What If" functionality of the Rule Editor 104 to simulate the action of the Rule Evaluator 106 on a rule. If the rule can be evaluated, this test returns to the caller the return state computed by the routing engine for a given set of variable values. A customer can use this feature to check the logic of a rule. If the rule cannot be evaluated, the test returns to the caller an indication of where a syntax error has occurred or where an invalid operation has been specified. In addition to a general syntax error, this test can warn of the following invalid operations: division by 0, operand/operator type mismatch, numeric overflow, complex number, undefined variables, and unset variables. Of course, this test cannot ensure that errors such as division by zero (0) will not occur under all circumstances at runtime.

The Rule Evaluator 106 may also be invoked for syntax checking through the Rule Editor 104 or directly via an API call to WFClauseCheck. This feature may be used to check the syntax of a conditional expression. If a syntax error is detected, the test returns to the caller an indication of where a syntax error has occurred or where an invalid operation has been specified. In addition to a general syntax error, this test can warn of the following invalid operations: operand/operator type mismatch, numeric overflow, and undefined variables.

This exemplary embodiment may also be described in reference to computer-implemented method steps 500–514 of rule-based task workflow management shown in FIG. 5 which detail embodiment operations of the WFM system 100 as shown in FIG. 1. This method includes the steps of providing 502 one or more rules. The rules may first be edited 504, and thereafter evaluated 506 including testing rule syntax and analyzing rule performance with different data values to observe the routing performed by the rule. "What If" functionality allows the user to test a specified rule for logic errors or run test scenarios with different data values to see where the work is routed in specified cases. The "What If" functionality allows a user to simulate the running of a rule without having to create work items to send through the map. This also assists in checking for logic errors.

Tasks may be routed 508 in a predetermined task execution sequence to one or more workers according to the rules. Access is provided 510 to data and documents required by each worker to complete a particular task. Also, aspects of worker performance of the tasks in the predetermined task execution sequence is tracked 512.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto. For example, the preferred embodiment WFM system was described in reference to a UNIX based client/server system. It will be appreciated by those skilled in the art that this system can be configured for use on computer systems which utilize other multitasking operating systems such as Microsoft Windows NT™ without departing from the scope and spirit of the present invention.

What is claimed is:

1. A computer-implemented task workflow management system for routing items and managing workflow based upon a plurality of rules, comprising:

a rule editor for editing the plurality of rules describing a predetermined task execution sequence; and a simulator, coupled to the rule editor, for simulating execution of the rules by providing values for rule variables and submitting the values to a rule evaluator without creating work items to send through a map.

2. The task workflow management system of claim 1 wherein the rule editor further comprises means for checking a syntax of the rule.

3. The task workflow management system of claim 2 further comprising means for selecting a portion of the rule having an incorrect syntax.

4. The task workflow management system of claim 1 wherein a condition for the rule is indicated under a first heading, and a return state is indicated under a second heading.

5. The task workflow management system of claim 1 wherein the rule editor is a client process and the simulator is a server process.

6. The task workflow management system of claim 1 wherein the rule editor further comprises test case means for providing a list of instance variables in the rule being simulated.

7. The task workflow management system of claim 1, further comprising means for setting a temporary instance variable in the rule being simulated.

8. The task workflow management system of claim 1 wherein the rule editor further comprises means for starting the simulation.

9. The task workflow management system of claim 1 wherein the rule editor further comprises message box displays for displaying a result of the simulation.

10. The task workflow management system of claim 1 wherein the rule editor further comprises means for highlighting a clause for which the clause was successful.

11. The task workflow management system of claim 1 further comprising rule evaluator means, operatively coupled to the rule editor, for evaluating a plurality of rules describing a predetermined task execution sequence such that the workflow management system is rule-based.

12. The task workflow management system of claim 11, wherein the plurality of rules are derived from a rule language.

13. The task workflow management system of claim 11, wherein the rule evaluator is invoked by calls from the rule editor.

14. A computer-implemented task workflow management system, comprising:

a workflow engine for routing tasks in a predetermined task execution sequence to a plurality of workers and providing access to data and documents required by each worker to complete a particular task;

rule evaluator, operatively coupled to the workflow engine, for evaluating a plurality of rules describing a predetermined task execution sequence such that the workflow management system is rule-based; and rule editor for editing a plurality of rules describing the predetermined task execution sequence, the rule editor comprising simulation for initiating a simulated running of a rule by providing values for rule variables and submitting the values to without creating work items to send through a map.

15. The task workflow management system of claim 14 wherein the rule editor further comprises means for checking a syntax of the rule.

16. The task workflow management system of claim 14 wherein a condition for the rule is indicated under a first heading, and a return state is indicated under a second heading.

17. The task workflow management system of claim 14 wherein the rule editor further comprises test case for providing a list of instance variables in the rule being tested.

18. The task workflow management system of claim 14, further comprising means for setting a temporary instance variable in the rule being simulated.

19. The task workflow management system of claim 14 wherein the rule editor further comprises means for starting the running of the simulation.

20. The task workflow management system of claim 14 wherein the rule editor further comprises a message box display for displaying a result of the simulation.

21. The task workflow management system of claim 20 wherein the rule editor further comprises means for highlighting a clause indicating that the clause was successfully fired.

22. The task workflow management system of claim 14 wherein the plurality of rules are derived from a rule language.

23. The task workflow management system of claim 14 wherein the rule evaluator is invoked by calls from the rule editor.

24. A computer-implemented method of rule-based task workflow management, comprising the steps of:

specifying a plurality of rules describing a predetermined task execution sequence, the plurality of rules being derived from a rule language; and simulating the running of a rule by providing values for rule variables and submitting them to a rule evaluator without creating work items.

25. The method of claim 24 further comprising the step of editing the plurality of rules describing the predetermined task execution sequence.

26. The method of claim 24 further comprising the step of checking a syntax of the rule.

27. The method of claim 24 wherein the step of simulating the running of the rule further comprises the step of indicating a condition for the rule under a first heading, and indicating a return state under a second heading.

28. The method of claim 24, further comprising the step of generating a list of instance variables in the rule being tested.

29. The method of claim 24 further comprising the step of highlighting a clause to indicate the clause was successfully fired.

30. The method of claim 24 further comprising the step of evaluating a plurality of rules describing a predetermined task execution sequence.

* * * * *

UNITED STATES PATENT AND TRADEMARK OFFICE
CERTIFICATE OF CORRECTION

PATENT NO.   : 5,848,393
DATED        : December 8, 1998
INVENTOR(S)  : Gilbert W. Goodridge, et al.

It is certified that error appears in the above-indentified patent and that said Letters Patent is hereby corrected as shown below:

Column 10, line 9, after "to", first occurrence, insert
             --the rule evaluator--.

Signed and Sealed this

Eighteenth Day of May, 1999

Attest:

Attesting Officer

Q. TODD DICKINSON

Acting Commissioner of Patents and Trademarks